United States Patent
Deutsch

[11] 3,879,397
[45] Apr. 22, 1975

[54] ALKYL THIO ETHER-SUBSTITUTED BENZANTHRONE ACRIDINE DYESTUFFS

[75] Inventor: Albert S. Deutsch, Yonkers, N.Y.

[73] Assignee: GAF Corporation, New York, N.Y.

[22] Filed: Sept. 8, 1972

[21] Appl. No.: 287,233

[52] U.S. Cl. ............... 260/274; 260/356; 260/378; 260/380; 8/33; 8/40
[51] Int. Cl. ........................................... C07d 37/30
[58] Field of Search ..................................... 260/274

[56] References Cited
UNITED STATES PATENTS

| | | | |
|---|---|---|---|
| 2,483,238 | 3/1944 | Scalera | 260/274 |
| 2,993,901 | 7/1961 | Von et al. | 260/274 |
| 3,027,374 | 3/1962 | Von et al. | 260/274 |

*Primary Examiner*—Richard J. Gallagher
*Assistant Examiner*—Mary C. Vaughn
*Attorney, Agent, or Firm*—Walter C. Kehm; Martin A. Levitin

[57] ABSTRACT

New benzathrone acridine dyestuffs are provided. The compounds of the present invention are those represented by the general formula:

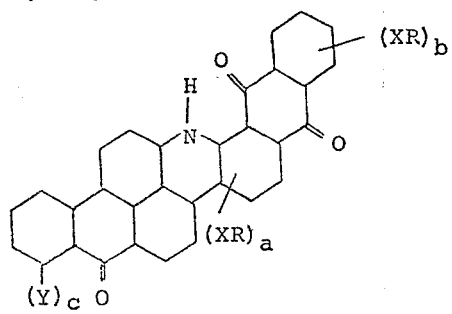

wherein $a$ and $b$ are either 0 or 1 and define the number of (XR) groups present on the designated rings according to the relationship $a + b = 1$;

X is either O or S;

R is an alkyl group having from one to six carbon atoms;

$c$ is either 0 or 1 and defines the number of (Y) groups;

and

Y is defined as

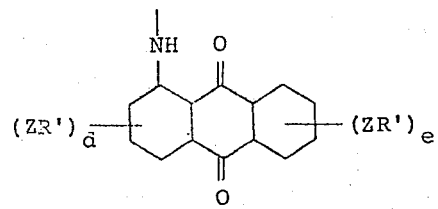

wherein $d$ and $e$ are either 0 or 1 and define the number of (ZR') groups present on the designated rings according to the relationship $d + e = 1$;

Z is either O or S;

R' is an alkyl group having from one to six carbon atoms.

These dyes combine the desirable properties of low infrared light reflectance and good light, chlorine, and wash fastness, making them desirable for military use.

3 Claims, No Drawings

ALKYL THIO ETHER-SUBSTITUTED BENZANTHRONE ACRIDENE DYESTUFFS

This invention relates to new benzanthrone acridine dyestuffs. More particularly, the present invention relates to new benzanthrone acridine dyestuffs which exhibit a desirable combination of properties rendering them suitable for military use.

Military garments must be capable of providing a degree of camouflage to the wearer. Typically, the use of camouflage relates to preparing the object or person to be camouflaged so that it blends into the environment and is rendered substantially indistinguishable from the surroundings. Until recent years, it has been possible to provide a satisfactory degree of camouflage by merely selecting colors which blend well into the average landscape. However, with the advent of infra-red light detection means, it has become necessary to provide a camouflage with a degree of infra-red light reflectance which is relatively low, preferably on the same order as that of the average surroundings. Generally, the degree of infra-red light reflectance of the camouflage should be the same as that of the surroundings; however, if there is a difference, it is desirable that the infra-red light reflectance of the camouflage be lower than that of the surroundings. Investigations have revealed that the infra-red light reflectance of the camouflage material should be below about 25%.

Another important criteria for camouflaging materials is that they have suitable light and wash fastness properties. The necessity for good light and wash fastness properties is manifest in view of the critical need to maintain the camouflage capabilities of the uniforms and other articles which must serve a long useful life under conditions of adversity. While the wash fastness of the dyed fabrics with regard to their appearance under visable light is of significance, such deterioration generally arises in the form of a change in color and can be readily noticed upon visual inspection before immediate danger arises. However, the losses to the camouflage capabilities of the dyed material with regard to infra-red light reflectance are not discernable under ordinary conditions and may go unnoticed until the camouflaged subject is imperiled. Thus, it is critically important that these materials, used because of their low infra-red light reflectance, have good light and wash fastness properties. Unfortunately, past experience has shown that few dyes exhibiting low infra-red light reflectance also possess satisfactory wash fastness properties.

U.S. Pat. Nos. 2,993,901; 3,027,377; 3,027,375; 3,027,373; 3,027,369 and 3,004,029 disclose certain dyes having low infra-red reflectance and desirable fastness properties.

It is an object of the present invention to provide another class of benzanthrone acridine dyestuffs which exhibit low infra-red reflectance and are sufficiently fast to light and washing to make them suitable for military use.

This and other objects are accomplished by the present invention which provides the new benzanthrone acridine dyestuffs represented by the following formula:

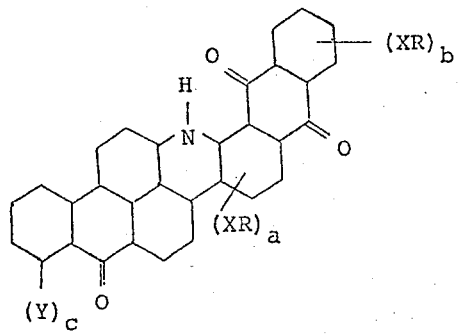

wherein
$a$ and $b$ are either 0 or 1 and define the number of (XR) groups present on the designated rings according to the relationship $a + b = 1$;
X is either O or S;
R is an alkyl group having from one to six carbon atoms;
$c$ is either 0 or 1 and defines the number of (Y) groups;
and
Y is defined as

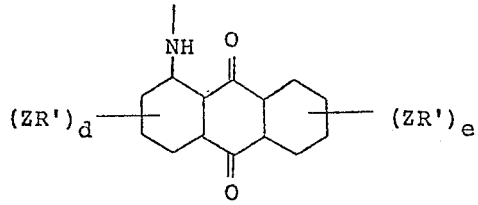

wherein
$d$ and $e$ are either 0 or 1 and define the number of (ZR') groups present on the designated rings according to the relationship $d + e = 1$;
Z is either O or S;
R' is an alkyl group having from one to six carbon atoms.

The dyes according to the above formula wherein $c = 0$ may be prepared by condensing 3-halogeno-7H-benz[de]anthracen-7-one with a suitable 1-aminoanthraquinone which contains either an alkoxy or a thioalkoxy group, and fusing the resulting anthramide in alcoholic caustic potash. The two reactants are used in equimolar quantities in this reaction.

The compounds according to the above formula wherein $c = 1$ are prepared by condensing 3,9-dihalogeno-7H-benz[de]anthracen-7-one with the suitable 1-aminoanthraquinone that contains either an alkoxy or thioalkoxy group, and fusing the resulting anthramide in alcoholic caustic potash. Twice the molar quantity of the 1-amino-anthraquinones are used in this reaction with the dihalogenated material. Also, the aminoanthraquinone in this case can be a mixture of two differently substituted aminoanthraquinones.

The alkaline fusion reaction by which the dye is formed can be carried out in alcoholic solvents such as methanol, ethanol, propanol, and ethylene glycol. The fusion temperature for this reaction can be in the range of 90°–175°C. and the ratio of potassium hydroxide to the anthramide can be in the range of 1.5–10.

The dyes of the present invention containing the alkoxy and/or thioalkoxy substituents, have been found to exhibit decreased infra-red light reflectance over the dyes of similar, known structures which do not contain these substituents. The dyes of the present invention have also been found to exhibit excellent fastness characteristics with regard to light, washing, bleaching and other treatments to which military equipment is subjected.

The following examples are for the purpose of further illustrating the present invention and are not to be taken as limiting with respect to the particular reactants, conditions or process steps involved. Unless otherwise stated, all parts and percentages are by weight

EXAMPLE I

A mixture of 17 g. 1-amino-4-methoxyanthraquinone, 20.7 g. bromobenzanthrone, 7.1 g. soda ash, 1.5 g. cuprous chloride, 0.36 g. copper and 200 ml. nitrobenzene is heated at 210°C. for 48 hours. The reaction mixture is cooled to room temperature to form a precipitate which is filtered and steam distilled. After all the nitrobenzene has been removed by steam distillation, the product is filtered and dried in an oven.

EXAMPLE II

A mixture of 65 ml. ethanol, 40 g. potassium hydroxide and 22.5 g. of the product from Example I is heated at 110°–120°C. for 2.5 hours. The reaction mass is then added to 500 ml. of water at 60°C. The resultant solution of reduced dye is oxidized with air and filtered to obtain a product of the following structure in quantitative yield:

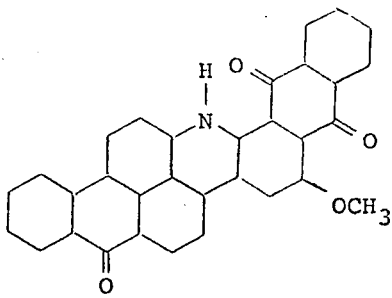

This product dyes cotton an olive green shade and has low infra-red reflectance and satisfactory chlorine, wash and light fastness.

EXAMPLE III

A mixture of 20 g. 1-amino-4-butylmercaptoanthraquinone, 23.5 g. bromobenzanthrone, 6 g. sodium carbonate, 1.5 g. cuprous chloride, 0.36 g. copper and 200 ml. nitrobenzene is heated at 210°C. for 48 hours. The mixture is cooled to room temperature to form a precipitate which is filtered and steam distilled. After all the nitrobenzene has been removed by steam distillation, the product is filtered and dried in an oven.

EXAMPLE IV

A mixture of 65 ml. ethanol 40 g. potassium hydroxide and 18 g. of the product from Example III is heated at 110°–120°C. for 2.5 hours. The reaction mass is then added to 500 ml of water at 60°C. The resultant solution of reduced dye is oxidized with air and filtered to produce a product of the following structure in nearly quantitative yield:

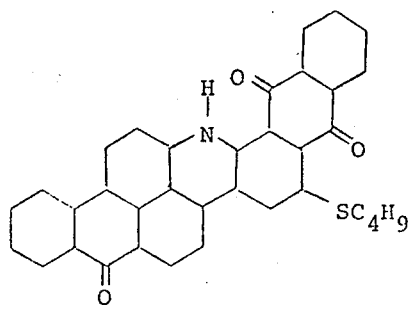

The product dyes cotton an olive green shade and has low infra-red reflectance and satisfactory chlorine, wash and light fastness.

EXAMPLE V

A mixture of 38.8 g. of 3,9-dibromo-7H-benz[de]anthracen-7-one, 62.2 g. 1-amino-4-butylmercaptoanthraquinone, 21 g. sodium carbonate, 1.7 g. cuprous chloride, 0.4 g. copper and 400 ml. nitrobenzene is heated for 48 hours at 210°C. The mixture is cooled to room temperature to form a precipitate which is filtered and steam distilled. The product is filtered and dried in an oven after removal of all of the nitrobenzene.

EXAMPLE VI

A mixture of 110 ml. ethanol, 71.5 g. potassium hydroxide and 40 g. of the product from Example V is heated at 110°–120°C. for 2½ hours. The reaction mass is then added to 1,000 ml. water at 60°C. and the resultant solution of reduced dye is oxidized with air and filtered to produce a product of the following structure in nearly quantitative yield:

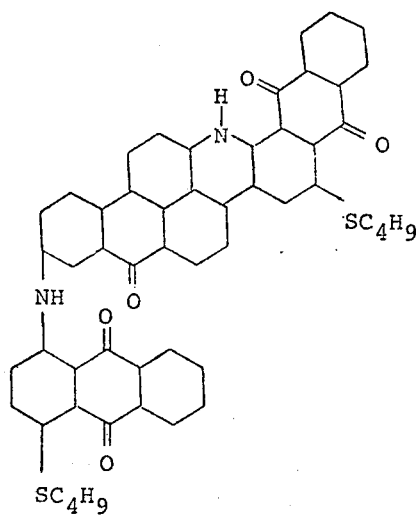

This product dyes cotton a brown shade, has low infra-red reflectance and satisfactory chlorine, wash and light fastness.

EXAMPLE VII

A mixture of 38.8 g. of 3,9-dibromo-7H-benz[de]-anthracen-7-one, 51 g. 1-amino-4-methoxyanthraquinone, 21.2 g. sodium carbonate, 1.7 g. cuprous chloride, 0.4 g. copper and 400 ml. nitrobenzene is heated at 210°C. for 48 hours. The reaction mixture is then cooled to room temperature to form a precipitate which is filtered and then steam distilled. After all the nitrobenzene is removed, the product is filtered and dried in an oven.

EXAMPLE VIII

A mixture of 110 ml. ethanol, 71.5 g. potassium hydroxide and 40 g. of the product from Example VII is heated at 110°-120°C. for 2.5 hours. The reaction mass is then added to 1,000 ml. water at 60°C. and the resultant solution of reduced dye is oxidized with air and filtered to yield a product of the following structure in almost quantitative yield:

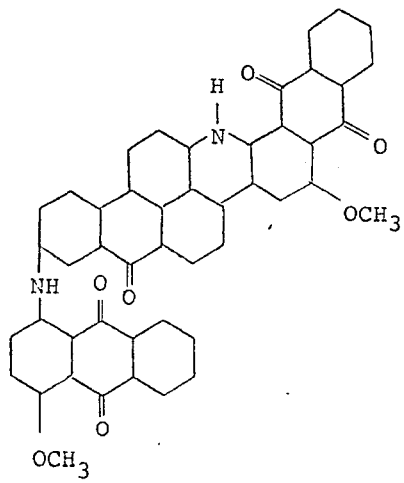

This product dyes cotton a grey shade and has low infra-red reflectance and excellent light fastness.

EXAMPLE IX

A mixture of 22.5 g. of 3,9-dibromo-7H-benz[de]-anthracen-7-one, 18 g. 1-amino-4-butylmercaptoanthraquinone, 14.7 g. 1-amino-4-methoxyanthraquinone 6 g. sodium carbonate, 0.8 g. cuprous chloride, 0.2 g. copper and 250 g. nitrobenzene is heated for 48 hours at 210°C. The reaction mixture is cooled to room temperature to form a precipitate which is filtered and then steam distilled. After all the nitrobenzene is removed, the product is filtered and dried in an oven.

EXAMPLE X

A mixture of 62 g. methanol, 125 g. potassium hydroxide and 25 g. of the product from Example IX is heated at 130°C. for 1.5 hours. The reaction mass is then added to 1,000 ml. water at 60°C. and the resultant solution of reduced dye is oxidized with air and filtered to yield a product which is a nearly quantitative yield of a dye mixture containing compounds of the following structures (1) through (4):

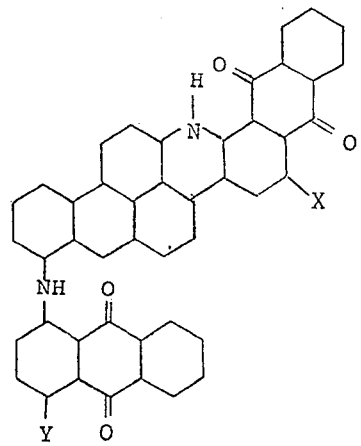

(1) X = $OCH_3$, Y = $OCH_3$;

(2) X = $SC_4H_9$, Y = $SC_4H_9$;

(3) X = $OCH_3$, Y = $SC_4H_9$; and (4) X = $SC_4H_9$, Y = $OCH_3$

This product dyes cotton an olive shade, has low infra-red reflectance and excellent chlorine, wash and light fastness.

It will be obvious to those skilled in the art that various modifications and changes can be made without departing from the spirit and scope of this invention which has as its principal feature the discovery of new benzanthrone anthraquinone acridine compounds useful as dyestuffs with suitable military use.

What is claimed is:

1. The compound having the formula

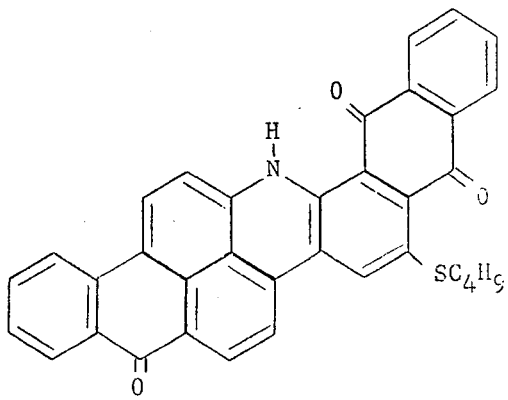

2. The compound having the formula
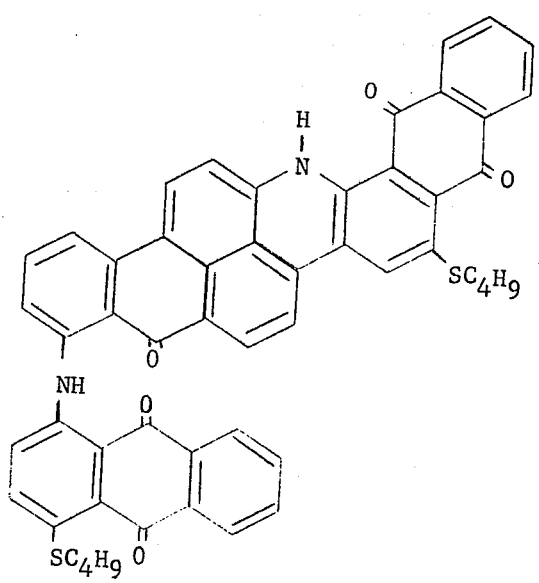
3. The compound having the formula
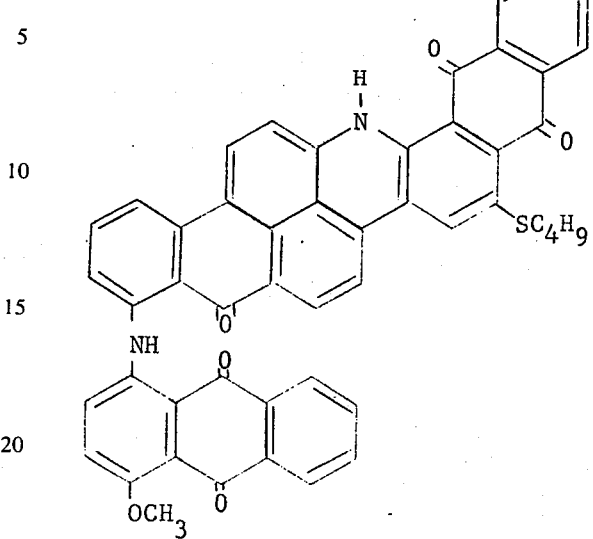
* * * * *